United States Patent [19]

Welch

[11] Patent Number: 4,883,148

[45] Date of Patent: Nov. 28, 1989

[54] FILL VALVE FOR LIQUID CONTAINING DEVICE

[75] Inventor: Richard C. Welch, Rockford, Ill.

[73] Assignee: Sundstrand Corporation, Rockford, Ill.

[21] Appl. No.: 255,834

[22] Filed: Oct. 11, 1988

[51] Int. Cl.[4] ............................................... F01M 1/18
[52] U.S. Cl. ........................................ 184/6.4; 251/65;
123/196 S; 184/103.1
[58] Field of Search ............................ 184/6, 6.4, 103.1;
251/65; 137/577, 587, 588; 123/196 S, 196 R

[56] References Cited

U.S. PATENT DOCUMENTS

| | | |
|---|---|---|
| 2,617,495 | 11/1952 | Johnson . |
| 3,203,439 | 8/1965 | Beckell ........................ 251/65 |
| 3,575,533 | 4/1971 | Bubula . |
| 3,924,708 | 12/1975 | Dabrowka . |
| 4,071,042 | 1/1978 | Lombard et al. .................. 251/65 |
| 4,569,196 | 2/1986 | Waddington et al. . |
| 4,589,524 | 5/1986 | Laycock . |

Primary Examiner—Carroll B. Dority
Attorney, Agent, or Firm—Antonelli, Terry & Wands

[57] ABSTRACT

A device (1) for use in conjunction with an engine (25) is adapted to contain a predetermined level (A) of a liquid such as oil therein. A fill passage (4) is provided for adding liquid to the device and a drain passage (7) is provided for draining liquid from the device when the liquid is above the predetermined level. A movable valve (12) is provided for opening and closing the fill passage and the drain passage. The valve is automatically positioned so as to close both passages in response to start up of the engine whereby liquid will not be lost through the passage during operation of the engine. The device may be an integrated drive generator in an aircraft which is designed to operate successfully in any aircraft attitude.

14 Claims, 1 Drawing Sheet

FILL VALVE FOR LIQUID CONTAINING DEVICE

TECHNICAL FIELD

The present invention is directed to a liquid containing device and a fill valve therefor for use in conjunction with an engine.

BACKGROUND ART

One type of liquid containing device which is used in conjunction with an engine is an integrated drive generator (IDG). An IDG is a hydraulically controlled electrical generator which is mounted to an aircraft engine and driven by the engine. The IDG is designed to operate successfully in any aircraft attitude. It is also designed to be internally sealed from ambient atmosphere during operation. The IDG is filled to a predetermined level with a liquid lubricant and coolant such as oil by pressure filling through a pressure fitting and fill passage of the device until the liquid begins to spill from an overflow drain passage provided in the device. The spilling of the liquid indicates that the "full" IDG liquid level has been attained. If the overflow drain passage of the IDG is plugged, as for example where the operator neglects to remove a drain plug in the drain passage during filling, the IDG may be over-filled with liquid, causing excessive liquid thrashing losses and heat generation during operation which can damage the IDG components.

Another potentially serious problem associated with the aforementioned type liquid containing device occurs where the drain plug is removed from servicing the IDG and is not replaced. In such a case, liquid can spill out of the overflow drain, especially during aircraft flight maneuvers. The liquid loss can result in damage to the IDG and is a potential fire hazard where a flammable liquid such as oil comes into contact with hot engine components.

A liquid containing device is known from U.S. Pat. No. 3,924,708 wherein respective ball valves are provided in supply and drain passageways of the device. The ball valves are normally biased in a closed position by means of springs. This device is disadvantageous because a special, external coupling member is required to open the valves for adding and draining liquid from the device. Liquid control devices are also known from U.S. Pat. Nos. 2,617,495; 3,575,533; 4,569,196 and 4,589,524.

DISCLOSURE OF INVENTION

An object of the present invention is to provide an improved liquid containing device and a fill valve therefor for use in conjunction with an engine which avoids the aforementioned problems and disadvantages of the conventional devices. More particularly, an object of the invention is to provide an improved liquid containing device and fill valve therefor for use in conjunction with an engine which prevent improper filling of the device without necessitating the use of a special, external coupling device.

A further object of the present invention is to provide an improved liquid containing device and fill valve therefor for use in conjunction with an engine, which prevent accidental operation of th device with either the drain passage or the fill passage in an open condition thereby permitting the device to be positioned in any special attitude while insuring that liquid contained in the device is not lost through either passage.

These and other objects are attained with the device of the invention for use in conjunction with an engine, the device comprising means for containing a predetermined level of liquid, fill passage means for adding liquid to the device to said predetermined level, drain passage means for draining surplus liquid from the device, movable valve means for opening and closing the fill passage means and the drain passage means, and means for positioning the valve means so as to close both the fill passage means and the drain passage means in response to start up of the engine.

The means for positioning the valve means in the disclosed embodiment comprises means for applying fluid pressure to the valve means in response to operation of the engine to position the valve means for automatically closing both the fill passage means and the drain passage means. The valve means further include means for maintaining the valve means in a position for closing both the fill passage means and the drain passage means when the engine is shut off. The means for maintaining includes the static friction of seals provided about the valve means. The means for maintaining can be manually overridden when the engine is shut off to open the passages for filling, venting, draining or otherwise servicing the device.

Means are also provided for retaining the valve means in the position for opening both the fill passage means and the drain passage means in the absence of operation of the engine. According to the disclosed embodiment, the mean for retaining comprises a magnet which holds the valve means in the position for opening both the fill passage means and the drain passage means. The force of the magnet on the valve means is much less than the force applied to the valve means by the means for positioning at start up of the engine whereby the valve means can be moved by the positioning means to close both the fill passage means and the drain passage means to prevent accidental loss of liquid regardless of the spacial attitude of the device.

According to a further feature of the invention, the fill passage means of the device includes an inlet for adding liquid to the device and the drain passage means includes an outlet for the liquid draining from the device. A drain plug is provided for closing the outlet of the drain passage means and a cover is provided for releasably covering the inlet of the fill passage means. As a further safety feature of the invention, the drain plug includes means for preventing either the cover from being removed from the inlet or the pressure filling hose from mating with the inlet while the drain plug closes the outlet whereby the device cannot be filled with liquid while the drain plug closes the outlet. The preventing means is in the form of a flange on the drain plug which protrudes over the cover on the inlet to prevent either removal of the cover from the inlet or mating of a pressure filling hose with the inlet when the drain plug closes the outlet.

The liquid fill valve of the device of the invention comprises a valve body, fill passage means in the valve body for conveying liquid to be added to the device, drain passage means in said valve body for conveying liquid drained from the device, and valve means in the form of a spool which is movable in the valve body between a first position where the spool opens both the fill passage means and the drain passage means and a second position where the spool closes both the fill passage means and the drain passage means.

One end of the spool is adapted to be acted upon by a fluid pressure upon operation of the engine to position the spool for closing both the fill passage means and the drain passage means. Thus, even if the drain plug for the outlet and cover for the inlet have not been replaced by the operator, loss of liquid from the device through these passage means is prevented. The other end of the spool is adapted to be manually pushed by the operator to slide the spool to a position for opening the fill passage means and the drain passage means during a period when the engine is off. The spool will remain in the passage-open position because of the magnetic attraction between a steel plate provided at the one end of the valve spool and an adjacent magnet mounted on the valve body.

These and other objects, features and advantages of the present invention will become more apparent from the following description when taken in connection with the accompanying drawings, which show, for purposes of illustration, one preferred embodiment in accordance with the present invention.

BEST MODE FOR CARRYING OUT THE INVENTION

Figure 1:
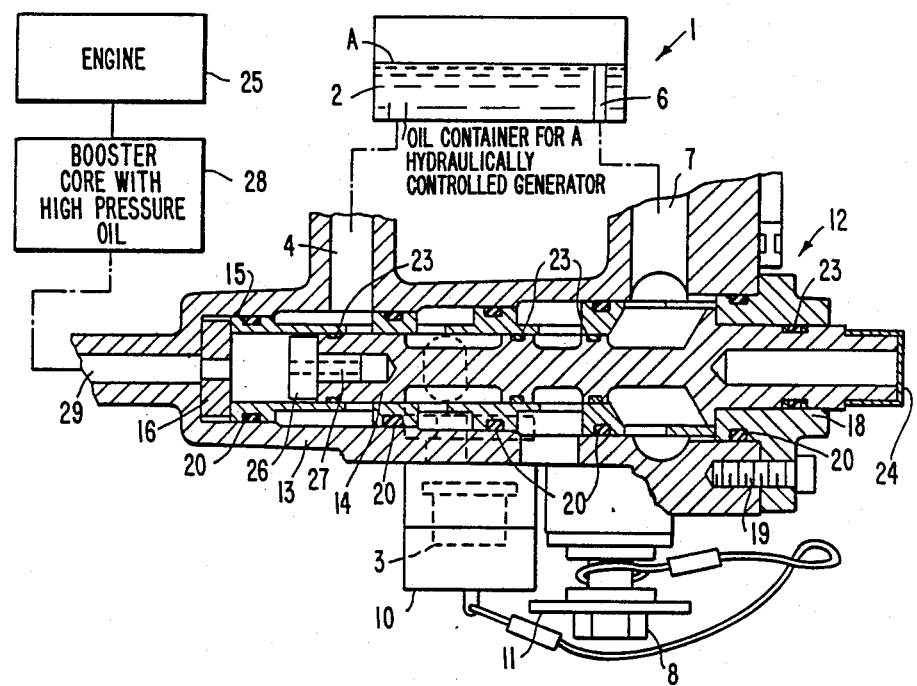
FIG. 1 is a schematic illustration, of a liquid containing device for use in conjunction with an engine, the fill valve of the device being shown in cross-section with the spool thereof in a first position to close both a fill passage and a drain passage.

Referring now to the drawings, a device 1 according to the invention is an integrated drive generator (IDG) for an aircraft. The IDG is an aircraft accessory which is designed to operate successfully in any aircraft attitude and to be internally sealed from ambient atmosphere during operation.

The device 1 includes a housing 2 shown schematically in FIG. 1 for containing a predetermined level A of oil. The housing is oil filled by pressure filling through an oil fitting 3 and a fill passageway 4 in communication with the housing 2 until oil begins to spill from an overflow drain 5 by way of a stand pipe 6 having an open top at the level A in the housing 2 and a drain passageway 7 having an outlet 9 at its lower end.

A removable drain plug 8 is provided for closing the outlet 9 of the drain passage 7. The plug is removed from the outlet during filling of the housing 2 so that air can escape and oil can eventually spill from the outlet to indicate that the "full" IDG oil level A has been attained. The oil fitting 3 is provided with a removable cover 10 over the fitting. The cover 10 is removably connected to the device over the oil fitting by means of a snap type closure arrangement, but other types of releasable connections could be employed. The drain plug is removably attached in the outlet 9 by cooperating screw threads provided on adjacent surfaces of these members.

If the outlet 9 is plugged as by the drain plug 8 not being removed, the IDG may be over-filled with oil, causing excessive oil thrashing losses and heat generation which could damage the IDG components (not shown). To prevent this from occurring, according to the invention, the drain plug 8 is provided with means for preventing the cover 10 from being removed from over the inlet fitting of the fill passage while the drain plug closes the outlet 9 whereby the device 1 cannot be filled with oil with the drain passage plugged by the plug 8. To this end, a flange 11 is provided on the drain plug 8. The flange 11 protrudes over the cover 10 to prevent its removal from the oil fitting 3 when the drain plug closes the outlet 9. Also, flange 11 interferes with the mating of a pressure fill hose coupling (not shown) with the oil fitting 3 while the plug 8 is in place. Thus, a sequenced removal of both the drain plug and the cover is required before pressure filling the device so that accidental over-filling of the IDG with oil is prevented.

Figure 2:
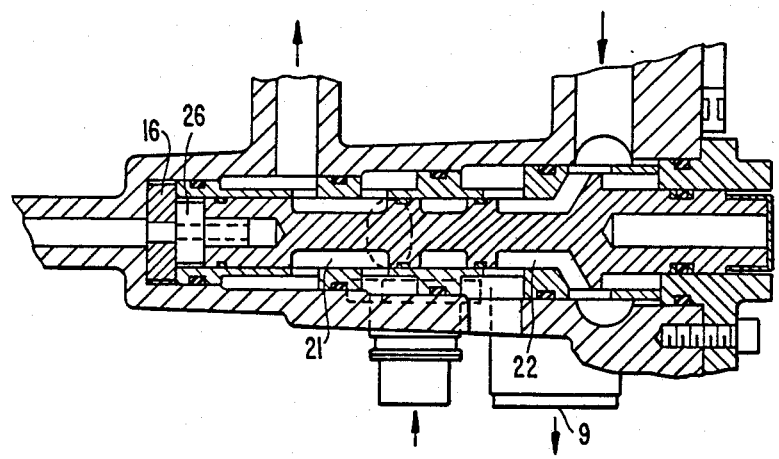
FIG. 2 is a cross-sectional view of the fill valve of the device of FIG. 1 wherein the spool of the valve is positioned in second position to open both the fill passage and the drain passage.

The device 1 further comprises a liquid fill valve 12 comprising a valve body 13 with a sleeve 18 therein, and a movable spool 14. In the open position of the spool as shown in FIG. 2, the fill passage 4 extends through the valve body 13, sleeve 18, and portions of the spool 14 between the oil fitting 3 and the housing 2 of the IDG device 1. Likewise, the drain passage 7 from the stand pipe 6 extends through the valve body 13, sleeve 18, and portions of the spool 14 to the outlet 9 for draining excess oil from the housing 2 of the IDG device after filling.

The sleeve 18 is located within an elongated cavity 15 in the valve body 13. An annular magnet 16 having a central passageway 17 therethrough is mechanically fastened or otherwise secured to the valve body 13 at the left or inner end of the cavity 15 as shown in the drawings. The elongated hollow sleeve 18 is positioned within the cavity 15 and sealed against the valve body 13 by a plurality of seals 20 such as 0-rings. A fastener 19 secures the cover 29 to the valve body. The seals 20 prevent ingress or egress of liquid from the fill passage 4 and drain passage 7 extending through the valve body and sleeve.

The spool 14 is located within the sleeve 18 of the valve body so as to be movable between a first position as shown in FIG. 2 where the spool passages 21 and 22 form part of the fill passage 4 and drain passage 7 and a second position, to the right of the first position, as shown in FIG. 1 wherein the passages 21 and 22 in the spool 14 are moved out of communication with the fill passage 4 and drain passage 7, respectively. In this position, surfaces of the spool close the fill and drain passages through the valve 12 thereby precluding filling or drainage of oil from the device 1. A plurality of seals 23, which may be 0-ring type seals, for example, are provided between the spool 14 and the surrounding sleeve 18 and cover 29 for preventing leakage of oil into or out of the passages 4 and 7.

For servicing the device 1, the service technician can manually move the spool 14 from the passage-closed position shown in FIG. 1 to the passage-open position shown in FIG. 2 by pushing the right end 24 of the spool 14 inwardly to slide the spool relative to the sleeve 18 and valve body 13. Servicing is performed when the engine 25 of the aircraft is off. Once pushed to the passage-open position as shown in FIG. 2, the spool 14 is retained in position, so long as the engine 25 is off, by means of the magnetic attraction between the magnet 16 held between the valve body 13 and the sleeve 18, and an annular steel plate 26 attached to the left end of the spool by fastener 27. After removing the drain plug 8 and the cover 10, oil can be added to and drained from the device. The oil fitting 3 for pressure filling the device 1 has a check valve therein to prevent loss of oil through the fitting after filling when the spool 14 remains in the passage-open position. The check valve prevents oil from flowing out of the oil fitting 3 at all times unless external oil pressure is provided to release the check valve.

After servicing, the cover 10 and drain plug 8 are replaced over the oil fitting 3 and in the outlet 9, respectively. As noted above, the spool 14 remains in the passage-open position shown in FIG. 2, because of the magnetic attraction between the magnet 16 and steel plate 26, so long as the engine remains off. In this regard, the magnet is an additional feature which is not necessary for the proper operation of the invention. For example, the friction provided by the seals 23, in many applications, is sufficient to hold the spool in place during the filling operation. Upon start up of the engine 25, a supply core 28 provides high pressure oil against the left end of the spool 14 by way of a passage 30 formed in the valve body 13 and the central passageway 17 through the magnet 16. The force from the high pressure oil overcomes the force of magnetic attraction between the magnet 16 and plate 26 and the static friction of the seals and drives the spool 14 rightwardly as shown in the drawings, to close the fill passage 4 and drain passage 7. This occurs automatically with start up of the engine 25. In such a condition, even if the operator has neglected to replace the drain plug 8, oil leakage through the drain passage 7 is prevented. Once the engine 25 is turned off, the spool 14 remains in the passage-closed position shown in FIG. 1 because of the static friction of the seals 23 between the spool and the sleeve 18 as referred to above. Thus, the safety of the aircraft and the reliable operation of the IDG device 1 are ensured against improper servicing of the device by the operator and without necessitating the use of special equipment external to the device.

While I have shown and described only one embodiment in accordance with the present invention, it is understood that the same is not limited thereto, but is susceptible to numerous changes and modifications as known to those skilled in the art. For example, the liquid fill valve and device of the invention could be used for adding and draining liquid from other types of devices than the integrated drive generator of an aircraft as disclosed herein. Further, while a single spool automatically and simultaneously closes both the fill passage and the drain passage upon engine actuation according to the disclosed embodiment, other valving arrangements could be employed to achieve the described closure of these passages upon engine actuation. Therefore, I do not wish to be limited to the details shown and described herein, but intend to cover all such changes and modifications as are encompassed by the scope of the appended claims.

I claim:

1. A device for use in conjunction with an engine, comprising means for containing liquid, fill passage means for adding liquid to the means for containing a liquid, drain passage means for draining liquid from the means for containing a liquid, movable valve means for opening and closing said fill passage means and said drain passage means, and means for positioning said valve means so as to close both said fill passage means and said drain passage means in response to start-up of said engine.

2. A device according to claim 1, wherein said means for positioning said valve means comprises means for applying fluid pressure to said valve means in response to start up of said engine to position said valve means for closing both said fill passage means and said drain passage means.

3. A device according to claim 1, wherein said valve means includes means for maintaining said valve means in a position for closing both said fill passage means and said drain passage means when said engine is shut off.

4. A device according to claim 3, wherein said means for maintaining includes the static friction of seals provided about said valve means.

5. A device according to claim 3, further comprising means for manually overriding said means for maintaining so that said valve means can be positioned so as to open both said fill passage means and said drive passage means when said engine is shut off to permit filling said means for containing a liquid with liquid.

6. A device according to claim 5, wherein means are provided for retaining said valve means in a position to open both said fill passage means and said drain passage means when said valve means has been manually moved to said position and in the absence of start up of said engine.

7. A device according to claim 6, wherein said means for retaining comprises means for magnetically holding said valve means in the position for opening both said fill passage means and said drain passage means, the force of the magnetic holding of said valve means being less than the force applied to said valve means by said means for positioning in response to start up of said engine whereby said valve means can be moved by said positioning means to close both said fill passage means and said drain passage means upon start up of said engine.

8. A device according to claim 1, wherein said fill passage means includes an inlet for liquid for said means for containing a liquid and said drain passage means includes an outlet for liquid from said means for containing a liquid, a drain plug being provided for releasably closing said outlet of said drain passage means and a cover being provided for releasably covering said inlet of said fill passage means.

9. A device according to claim 1, in combination with an integrated drive generator for an aircraft.

10. A device according to claim 1, wherein said liquid contained within said device is oil.

11. A device comprising means for containing a liquid, fill passage means for adding liquid to said means for containing a liquid, drain passage means for draining liquid from said means for containing a liquid, movable valve means for opening and closing said fill passage means and said drain passage means, and wherein means are provided for magnetically holding said valve means in a position for opening both said fill passage means and said drain passage means.

12. A device according to claim 11 for use in conjunction with an engine, further comprising means for positioning said valve means so as to close said fill passage means and said drain passage means in response to start up of said engine, the force of the magnetic holding means upon said valve means being less than the force applied to said valve means by said means for positioning in response to start up of said engine whereby said valve means can be moved and positioned so as to close both said fill passage means and said drain passage means.

13. A liquid fill valve for use with a device adapted to contain a predetermined level of liquid and be used in conjunction with an engine, said valve comprising a valve body, fill passage means in said valve body for adding liquid to said device, drain passage means in said valve body for draining liquid from said device, valve means in the form of a spool movable in said valve body between a first position where said spool opens both said fill passage means and said drain passage means and a second position where said spool closes both said fill passage means and said drain passage means, and wherein means are provided for positioning said spool so as to close both said fill passage means and said drain passage means in response to start up of said engine.

14. A liquid fill valve for a device adapted to contain a predetermined level of liquid therein, said valve comprising a valve body, fill passage means in said valve body for adding liquid to said device, drain passage means in said valve body for draining liquid from said device, valve means in the form of a spool movable in said body between a first position where said spool opens both said fill passage means and said drain passage means and a second position where said spool closes both said fill passage means and said drain passage means, and wherein means are provided for magnetically holding said spool in a position for opening both said fill passage means and said drain passage means.

* * * * *